(12) United States Patent
Brachetti

(10) Patent No.: US 10,007,494 B2
(45) Date of Patent: Jun. 26, 2018

(54) METHOD AND SYSTEM FOR DYNAMIC MANAGEMENT OF DIGITAL CONTENT AND RELATED DYNAMIC GRAPHICAL INTERFACE

(71) Applicant: SOCIAL NATION S.R.L., Milan (IT)

(72) Inventor: Livio Brachetti, Milan (IT)

(73) Assignee: SOCIAL NATION S.R.L., Milan (IT)

(*) Notice: Subject to any disclaimer, the term of this patent is extended or adjusted under 35 U.S.C. 154(b) by 0 days. days.

(21) Appl. No.: 15/179,313

(22) Filed: Jun. 10, 2016

(65) Prior Publication Data

US 2016/0364215 A1 Dec. 15, 2016

(30) Foreign Application Priority Data

Jun. 10, 2015 (IT) .................. 102015000022089
Jun. 9, 2016 (IT) .................. 102016000058966

(51) Int. Cl.
*G06F 8/38* (2018.01)
*G06F 9/451* (2018.01)
*G06F 3/0482* (2013.01)

(52) U.S. Cl.
CPC .............. *G06F 8/38* (2013.01); *G06F 3/0482* (2013.01); *G06F 9/451* (2018.02); *G06F 2203/04803* (2013.01)

(58) Field of Classification Search
None
See application file for complete search history.

(56) References Cited

U.S. PATENT DOCUMENTS

2015/0309681 A1* 10/2015 Plagemann ............. G06F 3/017
 345/156
2016/0216874 A1* 7/2016 Bayston ................ G06F 3/0481

OTHER PUBLICATIONS

EPO Search Report for Italian Application No. ITUB20151098 filed on Jun. 10, 2015 in the name of Social Nation S.R.L.
Kandogan E Et Al: "Elastic Windows: Design, Implementation, and Evalution of Mul Tl-Window Operations", Software Practice & Experience, Wiley & Sons, Bognor Regis, GB, vol. 28, No. 3, Mar. 1, 1998 (Mar. 1, 1998), pp. 225-248.

* cited by examiner

*Primary Examiner* — Kee M Tung
*Assistant Examiner* — Yanna Wu
(74) *Attorney, Agent, or Firm* — Steinfl + Bruno LLP

(57) ABSTRACT

Method and system for dynamic management of viewable digital contents (CD_ij), in which arranging a modular interface (11) comprising principal digital modules (Pi) and derived digital modules (Dij) extending prevalently in a first direction (d1); translating at least one of the principal digital modules (Pi) along a first path (t1) so that the principal digital modules (Pi) overlap at least partially; expanding the principal digital modules (Pi) along a second path (t2); selecting a viewable digital content; expanding the selected viewable digital content (CD_ij) along a third path (t3), determining at least a first derived digital module (Dij), in which translating at least one of the principal digital modules (Pi) along the first path (t1), expanding the principal digital modules (Pi) along the second path (t2) and expanding the selected viewable digital content (CD_ij) along the third path (t3) determine selective dynamic accessibility to the viewable digital contents (CD_ij) on the modular interface (11). A modular interface (11) for dynamic management of the viewable digital contents (CD_ij) is also described.

19 Claims, 17 Drawing Sheets

Fig. 4A2

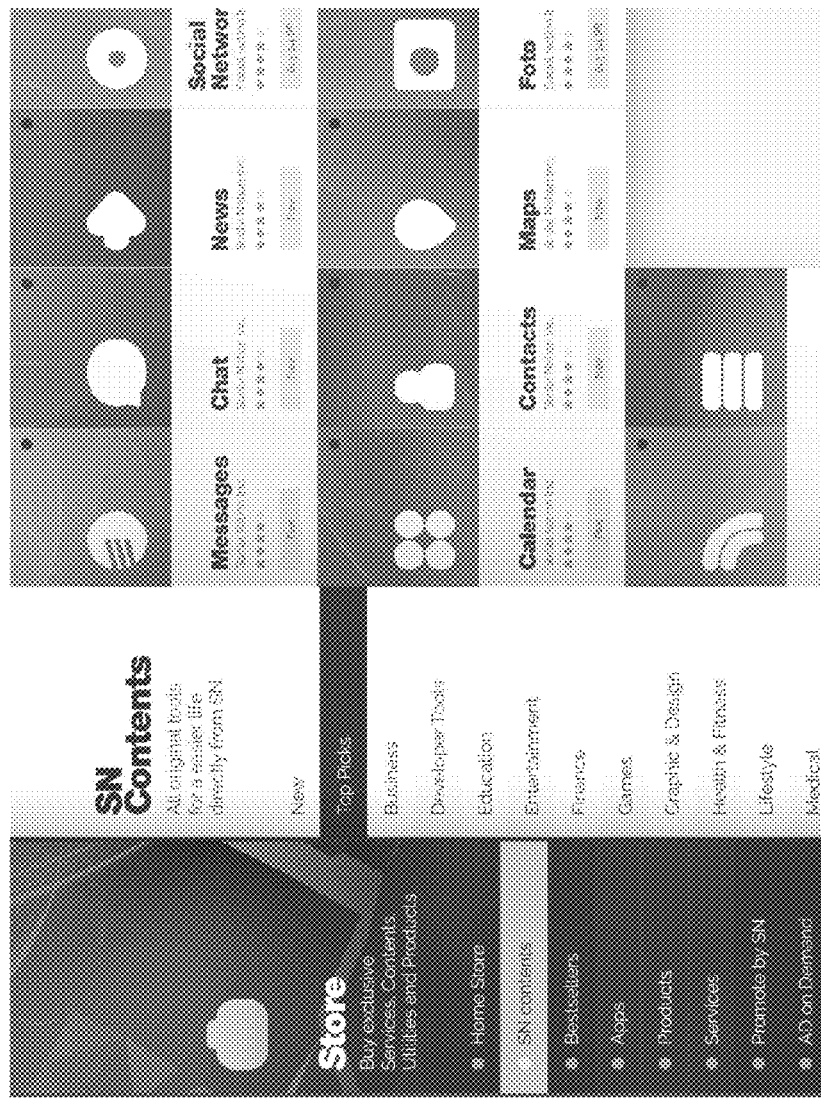
Fig. 4A3

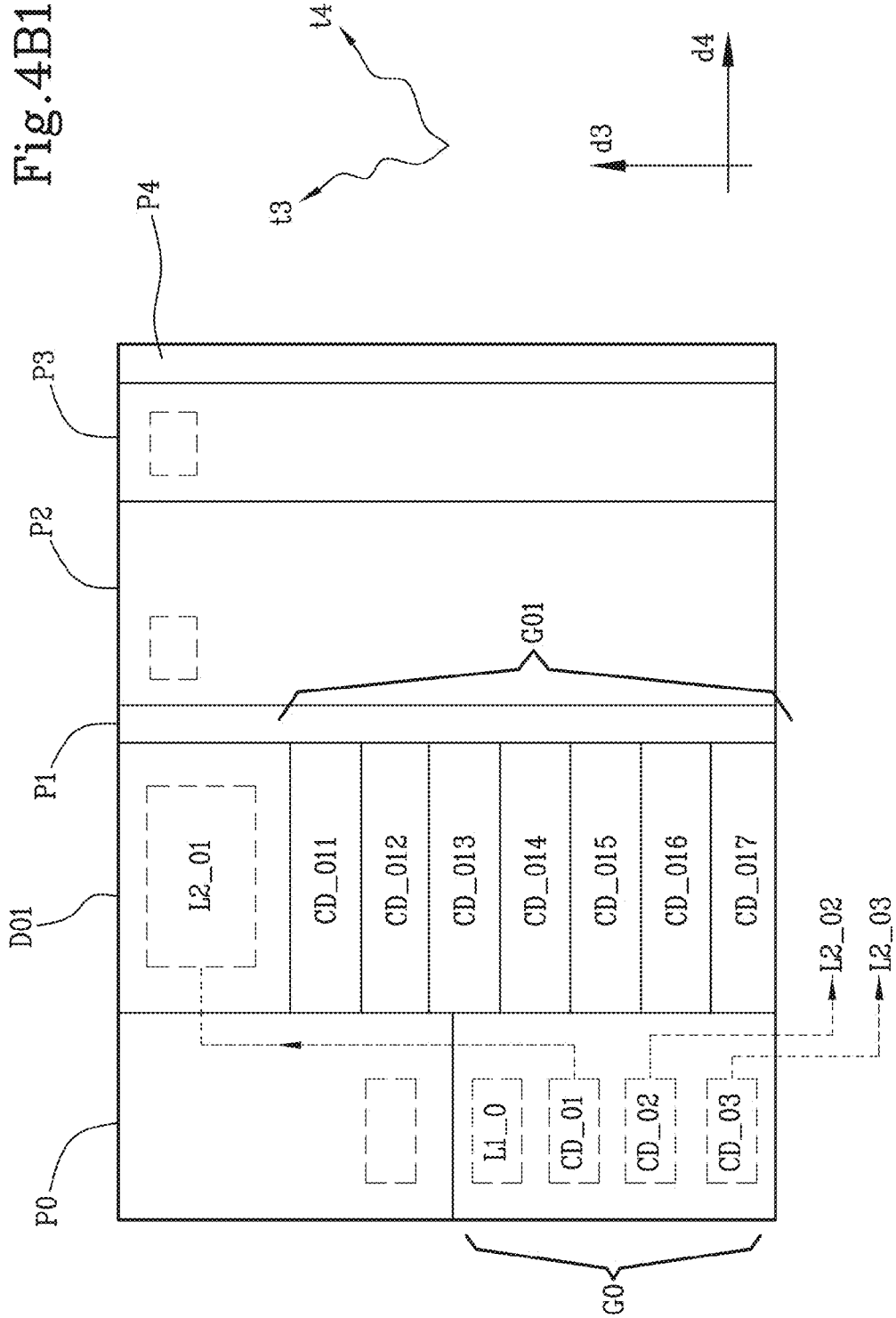

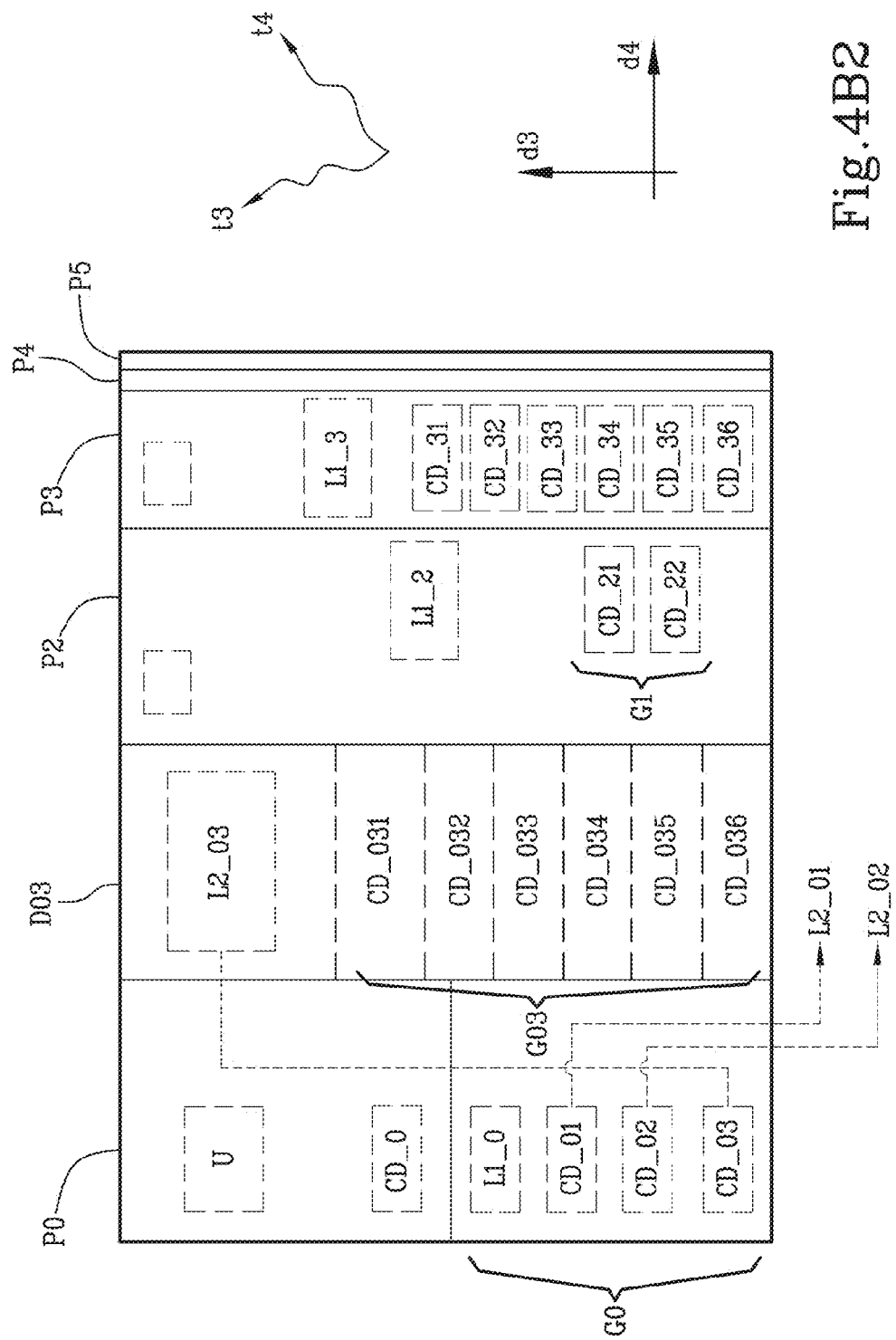
Fig.4B2

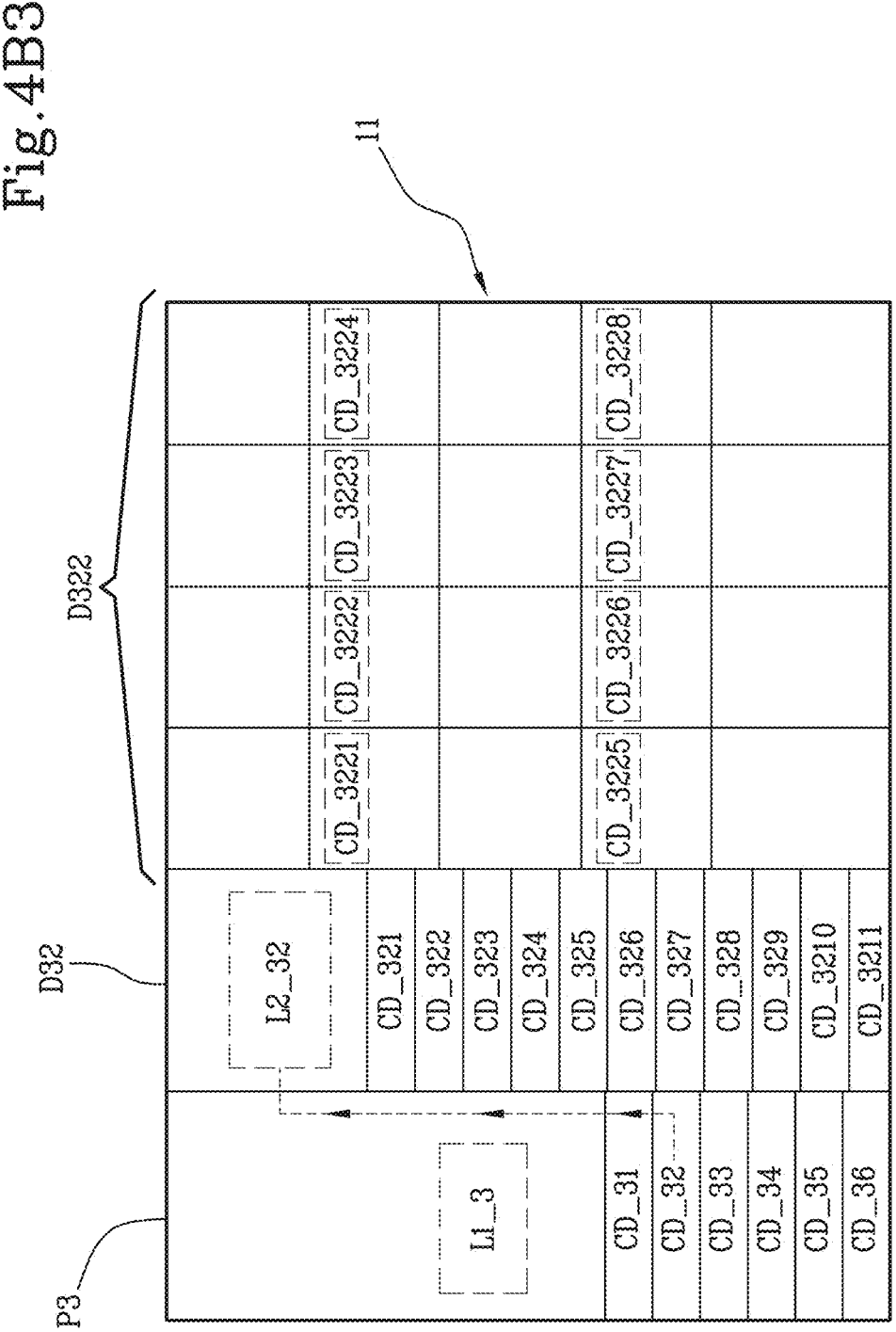

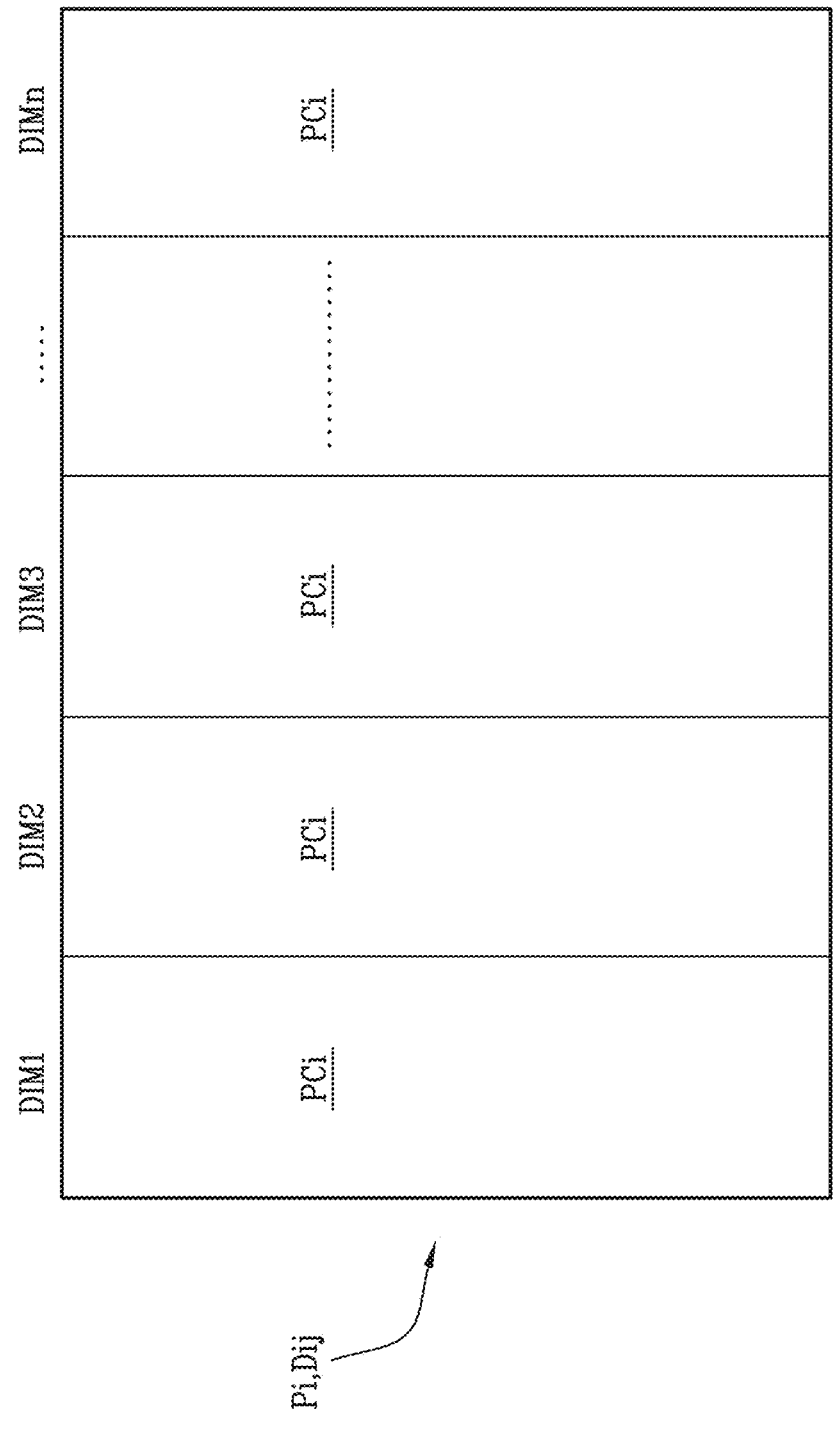

METHOD AND SYSTEM FOR DYNAMIC MANAGEMENT OF DIGITAL CONTENT AND RELATED DYNAMIC GRAPHICAL INTERFACE

CROSS REFERENCE TO RELATED APPLICATIONS

The present application claims priority to Italian Patent Application No. 102015000022089 filed on Jun. 10, 2015 and Italian Patent Application No. 102016000058966 filed on Jun. 9, 2016, both of which are incorporated herein by reference in their entirety.

FIELD OF APPLICATION

The object of the present disclosure is a method and a system for dynamic management of digital contents.

The object of the present disclosure is also a dynamic graphic interface configured to manage digital contents dynamically.

In particular, the present disclosure is intended for dynamic management of digital contents in electronic devices, such as computers, tablet PCs and smartphones.

PRIOR ART

There are prior-art digital content management systems, such as a system for managing contents that can be accessed from a personal computer, for example an Internet browser; multiple information is shown, mixed together with information of no interest to the user; the contents that are of interest are often shown in a number of frames/windows which are often overlapped sequentially, which do not allow for simultaneous viewing of the contents and require specific, unnatural commands to move from one view to another; the structure proves to be disadvantageous in terms of convenience/simple use for the user.

There are also other known content management systems; for example in the PlayStation 3, the navigation menu provides links, which, once activated, lead to other interactive environments.

The systems mentioned have a plurality of disadvantages related to their intrinsic structure, as well as to poor interactivity/flexibility/usability for the customer.

In light of the above, the general aim of the present disclosure is to make available a method and a system for dynamic management of digital contents and/or a dynamic interface configured to manage digital contents, all of which being capable of resolving the problems of the prior art.

A first aim is to make available a method and a system for dynamic management of digital contents, and/or a dynamic interface configured to manage digital contents, which ensures simple use of the digital contents by each user, without distinction.

A second aim is to make available a method and a system for dynamic management of digital contents, and/or a dynamic interface configured to manage digital contents, for optimized selective access to the digital contents.

A third aim is to make available a dynamic management method/system/interface for dynamic management of digital contents, which is flexible and easily scalable.

A fourth aim is to make available a method and a system for dynamic management of digital contents, and/or a dynamic interface configured to manage digital contents, which ensures easy interactivity with the user.

SUMMARY

These and other aims are achieved by the disclosure in accordance with that which is set forth in the appended claims.

In a first aspect, the present disclosure describes a method for dynamic management of viewable digital contents, comprising the steps of:
arranging a modular interface comprising principal digital modules and derived digital modules extending prevalently in a first direction and configured to be associated with at least a first level of the viewable digital contents;
translating at least one of the principal digital modules along a first path so that the principal digital modules overlap at least partially, determining accessibility to at least part of the viewable digital contents of the first level, as a function of the overlap;
expanding the principal digital modules along a second path so as to display a hierarchy of the first level of the viewable digital contents;
selecting a viewable digital content from the hierarchy representing viewable digital contents of a second level, for which viewing is requested;
expanding the selected viewable digital content along a third path, determining at least a first derived digital module so that the at least a first derived digital module at least partially overlaps at least one of the principal digital modules, determining accessibility to the viewable digital contents of the second level, as a function of the overlap; wherein the steps of
translating at least one of the principal digital modules along the first path,
expanding the principal digital modules along the second path and
expanding the selected viewable digital content along said third path, determine selective dynamic accessibility to the viewable digital contents on the modular interface as a function of the levels and the overlapping of the principal and derived modules.

In a second aspect, the present disclosure describes a system for managing viewable digital contents, comprising:
an electronic device equipped with a modular interface that implements an operating environment, in which the modular interface comprises:
principal digital modules extending prevalently in a first direction and configured to be associated with at least a first level of the viewable digital contents;
derived digital modules configured to overlap at least partially at least one of the principal digital modules, determining accessibility to a second level of the viewable digital contents, as a function of the overlap;
a processing unit comprising:
a translation operating module configured to translate the digital modules along a first path so as to create at least partial overlapping of the modules, determining accessibility to at least part of the viewable digital contents of the levels, as a function of the overlap;
a first expansion operating module configured to expand the principal digital modules along a second path so as to display a hierarchy of the viewable digital contents;
a selection operating module configured to select a viewable digital content from the hierarchy representing viewable digital contents of at least a second level, for which viewing is requested;

a second expansion operating module configured to expand the selected viewable digital content along a third path, determining at least a first derived digital module;

wherein the translation operating module, the first expansion operating module, the selection operating module and the second expansion operating module bring about selective dynamic accessibility to the viewable digital contents on the modular interface, as a function of the levels and the overlapping of the principal and derived modules.

In a third aspect, the present disclosure describes a dynamic management interface for managing viewable digital contents, which implements a modular operating environment, in which the interface comprises:

principal digital modules extending prevalently in a first direction and configured to be associated with at least a first level of the viewable digital contents;

derived digital modules configured to at least partially overlap at least one of the principal digital modules, determining accessibility to a second level of the viewable digital contents, as a function of the overlap;

in which the principal digital modules are expandable along a second path so as to display a hierarchy of the first level of the viewable digital contents;

in which the derived digital modules are expandable along a fourth path so as to display a hierarchy of the viewable digital contents.

Preferably, in one or more of the described aspects, the first path can be set as a second direction and/or
the second path can be set as a third direction and/or
the third path can be set as a fourth direction.

Preferably, in one or more of the described aspects, the principal digital modules are concatenated and/or the derived digital modules are concatenated.

Preferably, in one or more of the described aspects, the derived digital modules are linked to the respective principal digital modules.

Preferably, in one or more of the described aspects, the principal digital modules and/or the derived digital modules comprise n-dimensions.

Preferably, each dimension of the principal digital modules and/or the derived digital modules comprises characteristics/data defined as a function of one or more of at least the following configuration parameters:
 habits of a user of the method;
 device on which the method is applied;
 operating environment in which the method is operating.

Preferably, in one or more of the described aspects, translating at least one of the principal digital modules along a first path so that the principal digital modules at least partially overlap, is defined as a function of the configuration parameters.

Preferably, in one or more of the described aspects, the translation step is carried out according to one of the following possibilities, as a function of the configuration parameters:
 standard translation of a module so that it overlaps the module immediately following it;
 logical translation of a module so that it overlaps one or more of the other modules, starting from the one immediately following it, until it reaches a logically connected module, as a function of the configuration parameters.

Preferably, in one or more of the described aspects, the step of arranging a modular interface comprises the step of arranging a plurality of modular interface layers, in which each layer comprises the principal digital modules and the derived digital modules.

Preferably, in one or more of the described aspects, a database is arranged, comprising the viewable digital contents distributed on at least the levels cited.

Preferably, in one or more of the described aspects, the viewable digital contents are viewable by a user identifiable by means of a digital identifying content.

Preferably, in one or more of the described aspects, the digital contents viewable on the interface are updated with corresponding contents present in the database.

Preferably, the updating process is performed in backend.

Preferably, in one or more of the described aspects, the derived digital modules are expanded along a fourth path so as to display a hierarchy representing viewable digital contents of an additional level, for which viewing is requested in the derived digital modules.

Preferably, the fourth path can be set as a fifth direction.

Preferably, in one or more of the described aspects, a viewable digital content is selected from the hierarchy and it represents viewable digital contents of the additional level, for which viewing is requested in the derived digital modules.

Preferably, in one or more of the described aspects, translation of the modules is realized by means of a scrolling procedure for the concatenated modules, the scrolling process varying accessibility to the digital contents, as a function of at least partial overlapping of the concatenated modules.

Preferably, in one or more of the described aspects, dynamic management of the viewable digital contents is carried out by means of a computer.

Preferably, in one or more of the described aspects, the modular interface is arranged in an electronic device.

The electronic device preferably comprises one or more of at least the following: a computer, a tablet PC, a smartphone, a PDA or like devices.

Preferably, in one or more of the described aspects, the selection process for selecting a viewable digital content comprises one or more of at least the following:
 clicking with a mouse
 touching via a touchscreen display;
 highlighting using a keyboard;
 similar actions.

Preferably, in one or more of the described aspects, the first direction is a vertical direction and/or the second direction is a horizontal direction.

Preferably, in one or more of the described aspects, the third direction coincides with the first direction and/or the fourth direction coincides with the second direction.

Preferably, in one or more of the described aspects, electronic devices are arranged and configured for displaying the modular interface and/or the viewable digital contents.

Preferably, the electronic devices include one or more of at least the following:—computers;—tablets;—smartphone.

Preferably, in one or more of the described aspects, the modular interface is realized on a screen of a PC, of an iPad or of a smartphone.

The present disclosure, in general, offers the following technical effects:
 it provides a sole modular dynamic representation environment in which the same access page dynamically populated with contents of interest to the user is used;
 it facilitates and improves data entry;

it offers the user better manual control and better feedback from the system;

it facilitates data exchange between various applications through expanded formats for graphics.

it improves the presentation mode, making it more comprehensible and usable;

it ensures dynamic and balanced distribution of the information on the modular graphic interface;

it provides the user with selective access to his/her contents and functions, only when needed.

The technical effects cited and other technical effects of the present disclosure will emerge in further detail from the description provided herein below of an example embodiment and they are provided by way of approximate and non-limiting example with reference to the attached drawings.

BRIEF DESCRIPTION OF THE FIGURES

This description is provided herein below with reference to the accompanying figures, which are also provided purely by way of illustrative and thus non-limiting example, of which:

FIG. 2A is a second screenshot of the interface as obtained with the system and/or method for dynamic management of digital contents according to the invention, in a preferred embodiment of the present disclosure in a state with a number of translated principal modules.

FIG. 4A1 is a fourth screenshot of the interface as obtained with the system and/or method for dynamic management of digital contents according to the present disclosure, in a preferred embodiment of the invention in a state with an expanded derived module.

FIG. 4B1 is a schematic view of FIG. 4A1 highlighting the specific technical characteristics of FIG. 4A1.

FIG. 4A2 is a fifth screenshot of the interface as obtained with the system and/or method for dynamic management of digital contents according to the present disclosure, in a preferred embodiment of the present disclosure in a state with an expanded derived module.

FIG. 4B2 is a schematic view of FIG. 4A2 highlighting the specific technical characteristics of FIG. 4A2.

FIG. 4A3 is a sixth screenshot of the interface as obtained with the system and/or method for dynamic management of digital contents according to the present disclosure, in a preferred embodiment of the present disclosure in a state with two expanded derived modules.

FIG. 4B3 is a schematic view of FIG. 4A3 highlighting the specific technical characteristics of FIG. 4A3.

FIG. 8 shows an exploded module in the n-dimensions thereof, according to the present disclosure.

DETAILED DESCRIPTION

In a first aspect, the invention discloses a system for dynamic management of viewable digital contents.

The system of the invention is an intelligent and reliable digital system that gradually gets to know the users so as to simplify their personal, professional and institutional relations and activities.

Use of the system is associated with verification of a certified identity of the user U and it is safe, respectful of privacy and guided by principles of participatory democracy.

Moreover, the system is a virtual meeting place where users connect with other users and institutions to talk and work together, taking advantage of every positive experience.

The main functions of the system are realized by means of a dynamic and innovative user interface 11 that develops and adapts itself based on the actions and preferences of the individual users, bringing about selective access to a database 30 containing digital contents.

Figure 7:
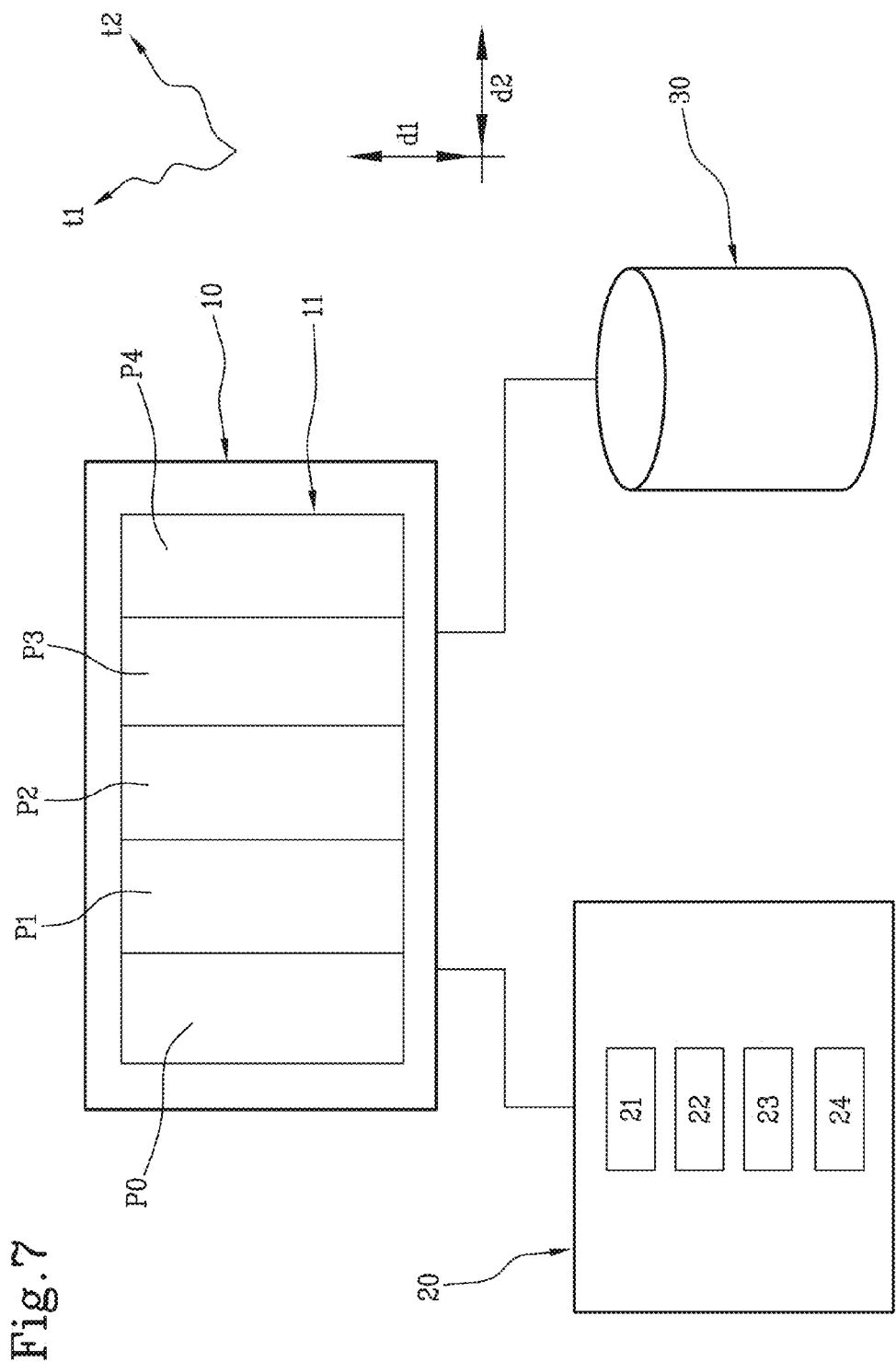
FIG. 7 is a diagram of the system for dynamic management of digital contents, according to the invention.

In further detail, with reference to FIG. 7, the dynamic management system of the invention comprises an electronic device 10.

The electronic device 10 preferably comprises one or more of at least the following: a computer, a tablet PC, a smartphone, a PDA or like devices.

The electronic device 10 is equipped with the modular interface 11 that implements an operating environment for dynamic management of viewable digital contents CD.

The user interface 11 is interactive, intelligent, expandable and multi-directional.

In one embodiment, the modular interface 11 comprises a plurality of layers STi of modular interfaces 11, in which each layer STi comprises the principal digital modules (Pi, where i=0 . . . n) and the derived digital modules (Dij, where i=0 . . . n and j=1 . . . n).

In a preferred embodiment of the present disclosure, there is one layer Sti and therefore one modular interface 11.

In one embodiment, the interface is characterized by vertical dynamic modules that vary their dimensions as a function of the actions of the user so as to show or hide contents according to the principle of the advanced accordion.

In a preferred embodiment, the dynamic modules comprise, more specifically they are constituted by, columns.

The module element presents the content, shrinking or expanding horizontally and scrolling vertically to the first level of interaction and in subsequent levels. Each derived module (sub-column) inherits the general properties of the content management system, making endless information virtually possible, which, in turn, inherits the properties of the advanced accordion, which accesses, divides or organizes the contents.

The modular interface ensures ease and immediacy in terms of use.

The modules move on the displays, based on the commands given by the user, as a single entity that is dynamic, responsive and based on ordered, scientific principles of gravity, inertia, consequentiality (between modules) and speed.

With reference to the figures, the modular interface 11 comprises principal digital modules (Pi, where i=0 . . . n) and derived digital modules (Dij, where i=0 . . . n and j=1 . . . n).

These principal/derived digital modules comprise graphic structures realized as programming objects having properties and functions.

Figure 2B:
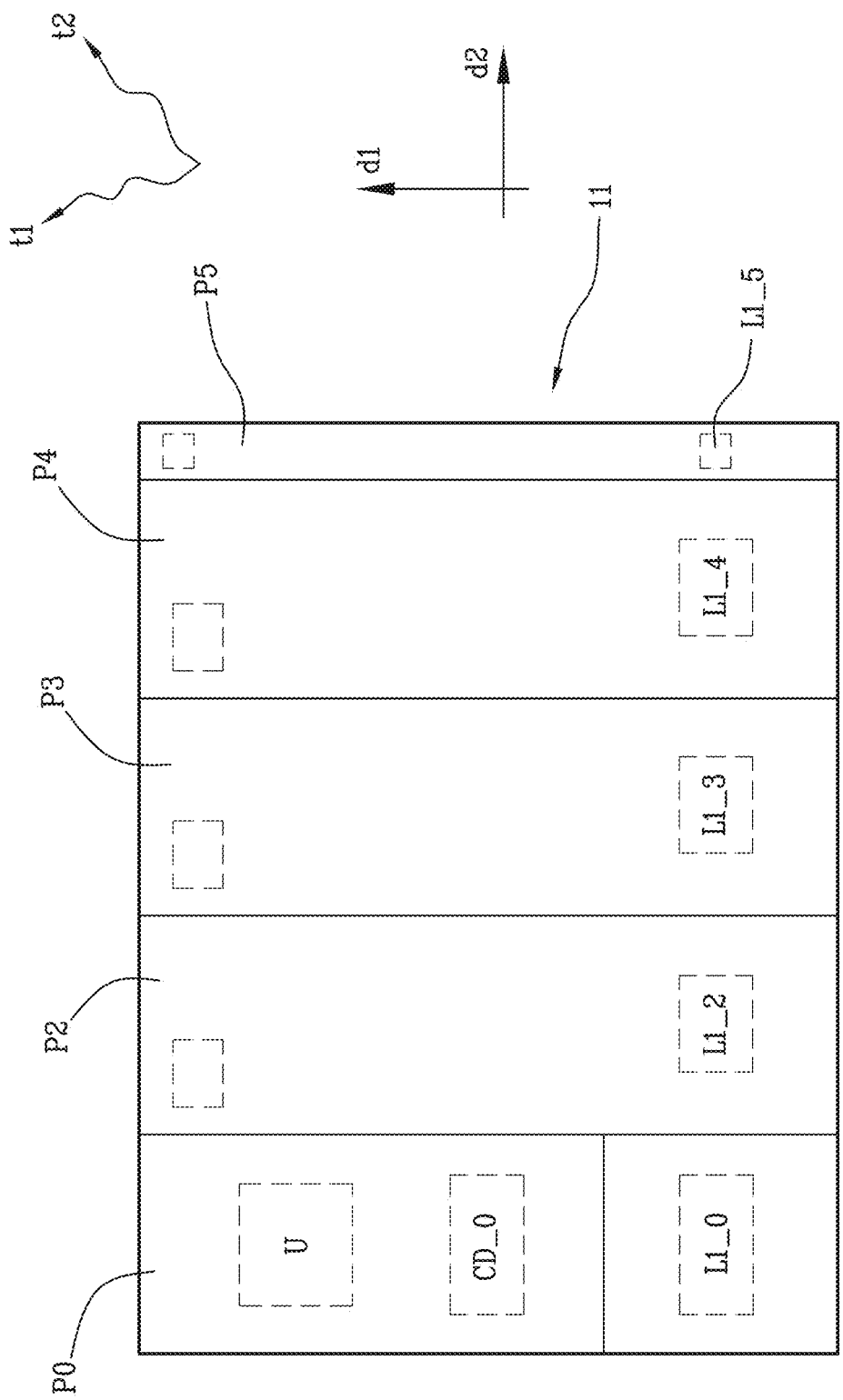
FIG. 2B is a schematic view of FIG. 2A highlighting the specific technical characteristics of FIG. 2A.

The index "i" referring to the principal digital modules represents the progressive number of a module, starting from a principal digital module (or primary module) P0, e.g. in FIGS. 2A and 2B.

The index "i" in the derived module refers to the principal module from which it is derived, e.g. in FIGS. 4A and 4B, whereas the index "j" represents the progressive number of a derived module of the same principal module; it is understood that an arbitrary number of derived modules of the same principal module can be present.

According to the present disclosure, the principal digital modules Pi prevalently extend in a first direction d1, preferably in a vertical direction.

The principal digital modules Pi are configured to be associated with at least a first level (L1_$i$, where i=0 . . . n) of the viewable digital contents CD_ij.

According to the present disclosure, the derived digital modules Dij are configured to overlap at least partially at least one of the principal digital modules Pi, determining accessibility to a second level L2_$ij$ (where i=0 . . . n and j=1 . . . n) of the viewable digital contents CD_ij, as a function of the overlapping that has taken place.

The system comprises a database 30 comprising the viewable digital contents CDi, CD_ij distributed on a number of levels, particularly at the least the levels L1_$i$ and L2_$ij$.

In particular, the level L1$i$ indicates a first level of data accessible from the i-th principal module Pi.

With reference to the figures, by way of example, the first level of data L1_$i$ comprises: L1_0=connect; L1_1=welcome; L1_2=feeds; L1_3=store; L1_4=talks etc.

In particular, the level L2$ij$ indicates a second level of data accessible from the j-th derived module of the i-th principal module Pi.

With reference to FIGS. 4A1 and 4B1, by way of example, the second level of data L2_$ij$ comprises: L2_01=people, L2_02=groups; L2_03=hubs.

The hierarchy of the levels is a function of the requested degree of detail of the contents and of the specific characteristics thereof.

Preferably, the viewable digital contents CD_ij comprise:
  Connect (L1_0): functions: above, settings, below people, Groups, Hubs, Favourites.
  Feeds (L1_3): functions: above, settings, below, news, notifications, AdWords.
  Store (L1_3): functions: above, settings, below, home store, sn contents, Bestsellers, Apps, Products, Services, Promote by SN, AD on Demand.
  Talk (L1_4): functions: above, settings, below, mail, chat IM, Social Network.
  Sn Tools (L1_5): functions: above, settings, below, Contacts, Calendar, Maps, Docs, Photos, Blog.
  Easy Life (L1_6): functions: above, settings, below, add service, names of companies connected.
  Apps (L1_7): functions: above, settings, below, applications activated by the user.
  Products (L1_8): functions: above, settings, below, names of companies of purchased or preferred products.
  Services (L1_9): functions: above, settings, below, names of companies with which one has relations or support.

Figure 1A:
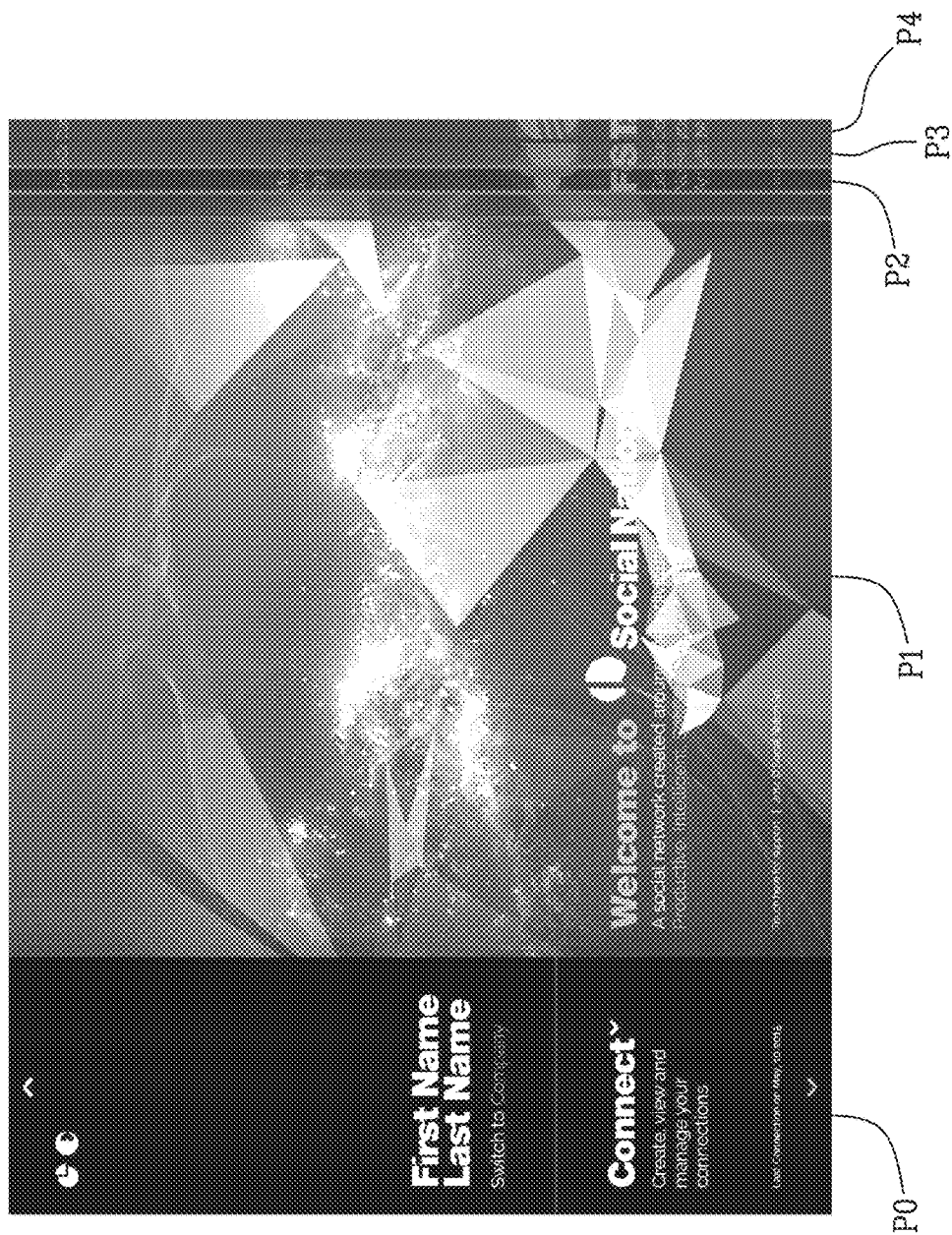
FIG. 1A is a first screenshot of the interface as obtained with the system and/or method for dynamic management of digital contents according to the invention, in a preferred embodiment of the present disclosure in an initial state of access to the system, said state of access having taken place.
Figure 1B:
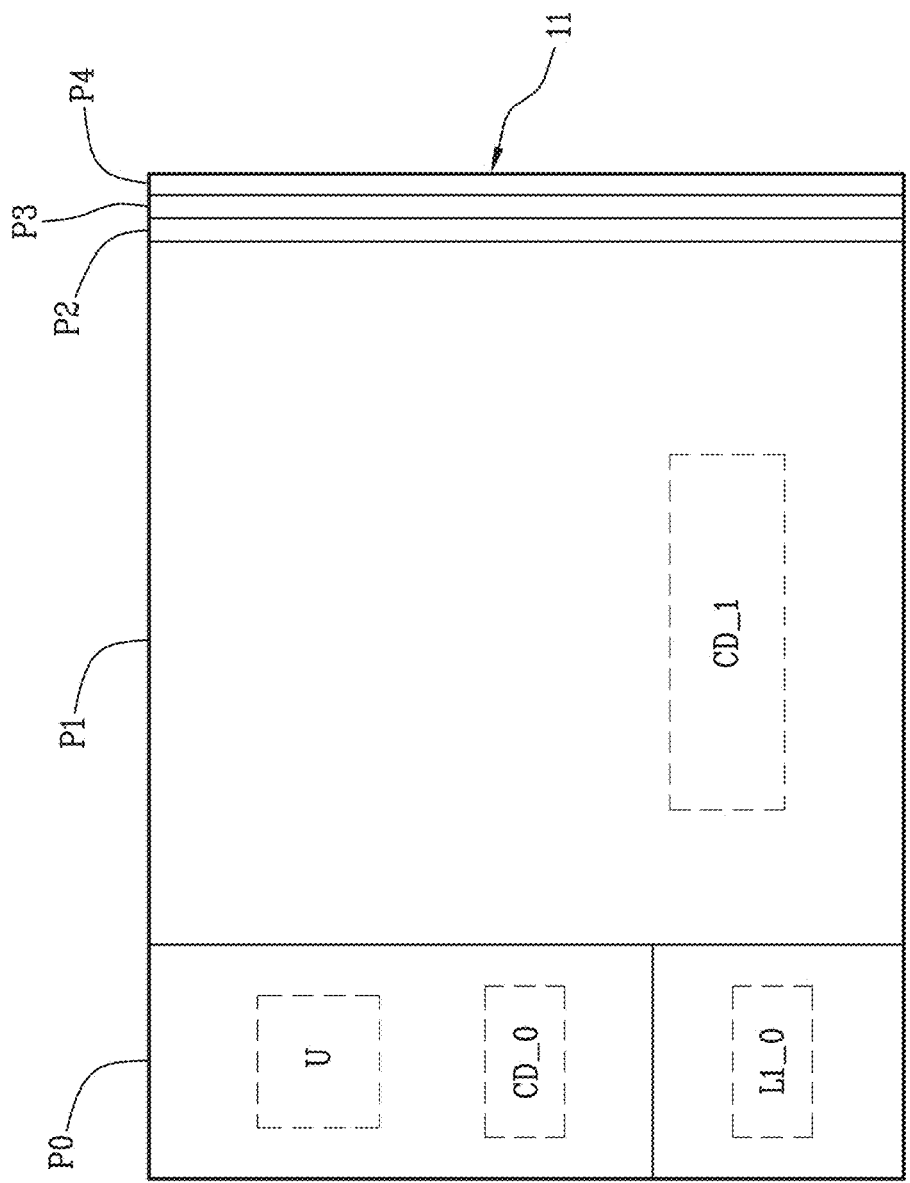
FIG. 1B is a schematic view of FIG. 1A highlighting the specific technical characteristics of FIG. 1A.

With particular reference to FIGS. 1A and 1B, the modular interface 11 comprises a first principal module P0, also called the primary module, which is configured to identify the user U.

The modular interface 11 comprises, in the primary module, a digital identifying content (CD_0 First Name Last Name) that can be viewed by the user U.

Access to the primary module P0 and therefore the resulting access to the other principal modules Pi, is gained by means of a certified digital identification system like the one shown in European patent application No. 15163027.4 filed by the same applicant, incorporated herein by reference in its entirety.

The technical effect achieved consists in secure identification of the user U, which enables the user to navigate the system, accessing all levels of the viewable digital contents connected to the user.

As a result, referring particularly to FIGS. 1A and 1B, after the user U has logged in with a base content (CD_0), the system initializes the primitive module P0 and shows the user U in the only module shown differing from the background (second primary module P1).

Preferably, the primitive module P0 is presented to the left on the interface 11, the background P1 is presented to the right of the primitive module P0, and to the right of the background P1 there is a plurality of "collapsed" principal modules Pi (P2, P3, P4) of which only a minimal part is visible.

The technical effect achieved consists in an overall view of the interface 11 and of possible accesses represented by the "collapsed" principal modules Pi which provide an idea of the contents ready for access.

The dynamic management system comprises a processing unit 20.

In general, it should be noted that in the present context and in the claims herein below, the processing unit 20 is presented as being subdivided into distinct functional modules (memory modules or operating modules) for the sole purpose of describing its functions clearly and thoroughly.

Actually, this processing unit 10 can be constituted by a single electronic device, suitably programmed for performing the functions described, and the various modules can correspond to a hardware entity and/or routine software that are part of the programmed device.

Alternatively or additionally, these functions can be performed by a plurality of electronic devices in which the above-mentioned functional modules can be distributed.

The processing unit 10 can also make use of one or more processors for execution of the instructions contained in the memory modules.

The above-mentioned functional modules can also be distributed in different computers, locally or remotely, based on the architecture of the network in which they reside.

The processing unit 20 is configured to manage operations for access and/or selection and/or extraction of contents from the database 30 by means of the modular interface 11.

The processing unit 20 comprises a translation operating module 21 configured to translate the digital modules Pi, Dij along a first path t1 so as to create at least partial overlapping of these modules.

This determines accessibility to at least part of the viewable digital contents CD_ij of the levels L1_$i$ and L2_$ij$, as a function of the overlapping created.

The first path t1 can consist of any curvilinear or rectilinear path that is definable for example by means of a "gesture".

The consideration reported above shall hold for other paths that will be defined herein below.

Preferably, the first path t1 is a second direction d2.

Preferably, the second direction d2 is a horizontal direction.

The processing unit 20 comprises a first expansion operating module 22 configured to expand the digital modules Pi, Dij along a second path t2, particularly in a third direction d3.

This results in the display of a hierarchy Gi (where i=0 . . . n) of the viewable digital contents CD_ij, as shown in detail in FIGS. 4A1, 4A2, 4B1, and 4B2.

Preferably, the second direction d3 coincides with the first direction d1.

The processing unit 20 comprises a selection operating module 23 configured to select a viewable digital content CD_ij from the hierarchy Gi representing viewable digital contents of at least a second level L2_$ij$, for which viewing is requested.

The processing unit 20 comprises a second expansion operating module 24 configured to expand the selected viewable digital content CD_ij along a third path t3, particularly in a fourth direction d4.

This creates a first derived digital module Dij.

Preferably, the fourth direction d4 coincides with the second direction d2.

Advantageously, according to the present disclosure, the translation operating module 21, the first expansion operating module 22, the selection operating module 23 and the second expansion operating module 24 bring about selective dynamic accessibility to the viewable digital contents CD_ij on the modular interface 11, as a function of the levels L1_$i$ and L2_$ij$ and the overlapping of the principal modules Pi and the derived modules Dij.

The system of the present disclosure has been disclosed in general terms up to this point.

This system constitutes the physical support needed to carry out instructions/functions/operations on the modular interface 11 and in the database 30.

In other words, the system supplies a support for implementing the method of the present invention which shall be disclosed herein below.

In a second aspect, the present disclosure describes a method for dynamic management of digital contents.

The method of the invention comprises arranging the modular interface 11 comprising the principal digital modules Pi and the derived digital modules Dij extending prevalently in a first direction d1, preferably in a vertical direction.

The principal digital modules Pi are configured to be associated with at least a first level L1_$i$ of the viewable digital contents CD_ij.

FIG. 1A shows a first screenshot of the interface 11 obtained, in a preferred embodiment of the invention. Like the others shown in the figures and described below, this screenshot is accompanied by a corresponding schematic diagram (FIG. 1B) that highlights the specific technical characteristics of FIG. 1A for the purposes of disclosure.

In FIG. 1B, the first module to the left is the first principal module (or primary module) P0, which comprises the user U identification data (First Name Last Name in FIG. 1A) expressed with a digital identifying content CD_0. A second principal welcome module P1 is shown alongside to the right of the first principal module P0; it is accessible once the user U has been recognized by the system, and a plurality of subsequent principal modules P2, P3, P4 are only partially shown because they partially overlap each other.

All the other figures that shall be described assume the presence of the first principal module P0, in plain view or below the other principal modules Pi, which ensures access to the system by means of certified identification.

FIG. 2A shows a second screenshot of the modular interface 11, in a preferred embodiment of the present disclosure.

The specific technical characteristics of FIG. 2A are shown in FIG. 2B for the purposes of disclosure.

FIG. 2B shows:

the first principal module P0 associated with at least a first level L1_0; in particular, this first level L1_0 comprises the contents related to management of possible connections with online users (Connect: Create view and manage your connections in FIG. 1A);

a third principal module P2 associated with at least a first level L1_2 of the viewable digital contents CD_ij.

In particular, this first level L1_2 comprises the contents related to information and news (Feeds: Get the latest News Notifications and AdWords in FIG. 2A).

a fourth principal module P3 associated with at least a first level L1_3 of the viewable digital contents CD_ij.

In particular, this first level L1_3 comprises the contents related to purchases (Store: Buy exclusive Services, Contents, Utilities and Products in FIG. 2A).

a fifth principal module P4 associated with at least a first level L1_4 of the viewable digital contents CD_ij.

In particular, this first level L1_4 comprises the contents related to communication with other users (Talk: Communicate with your friends via e-mail, IM and Video in FIG. 2A).

part of a sixth principal module P5 associated with at least a first level L1_5 of the viewable digital contents CD_ij.

Figure 3A:
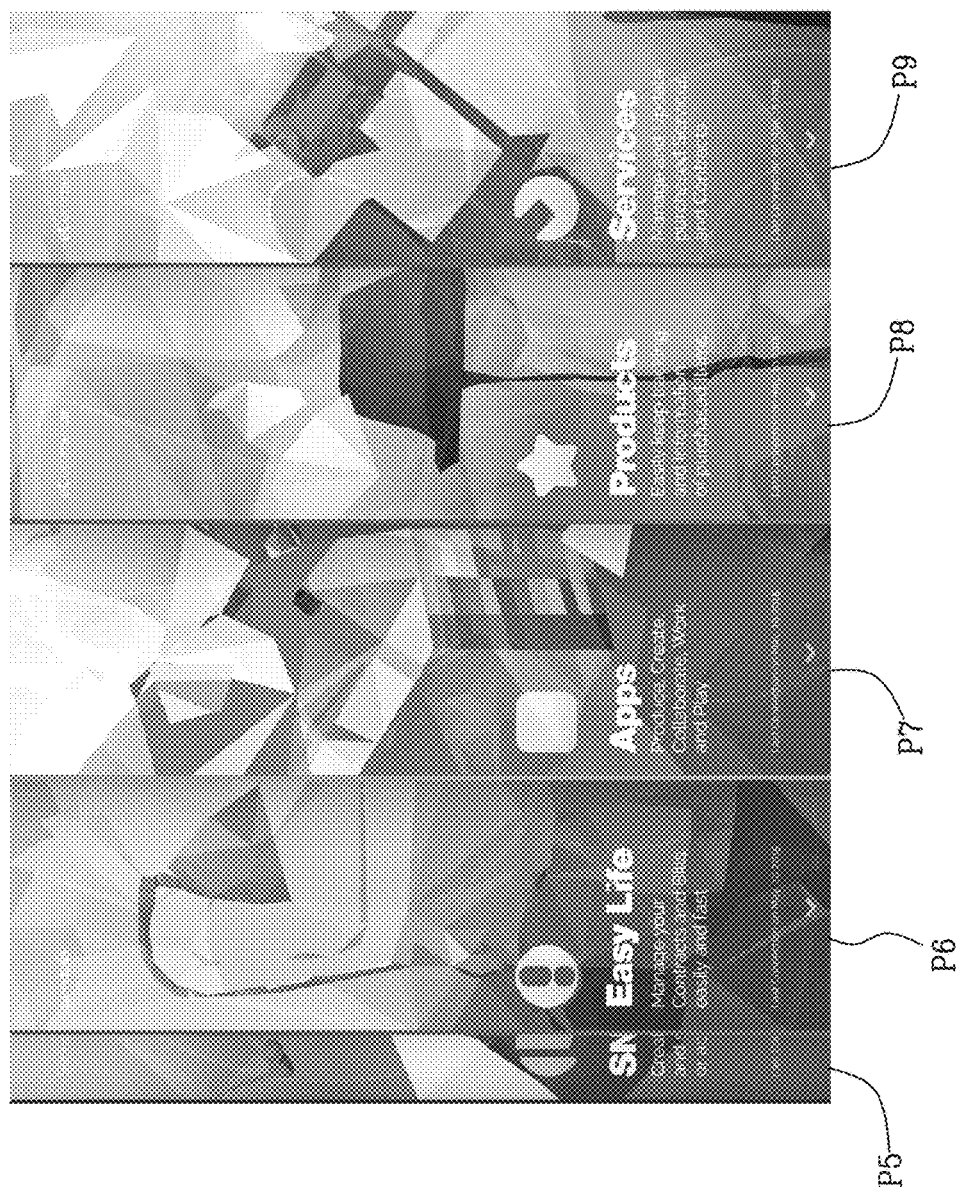
FIG. 3A is a third screenshot of the interface as obtained with the system and/or method for dynamic management of digital contents according to the present disclosure, in a preferred embodiment of the invention in a state with a number of translated principal modules.

FIG. 3A shows a third screenshot of the interface 11, in a preferred embodiment of the present disclosure.

Figure 3B:
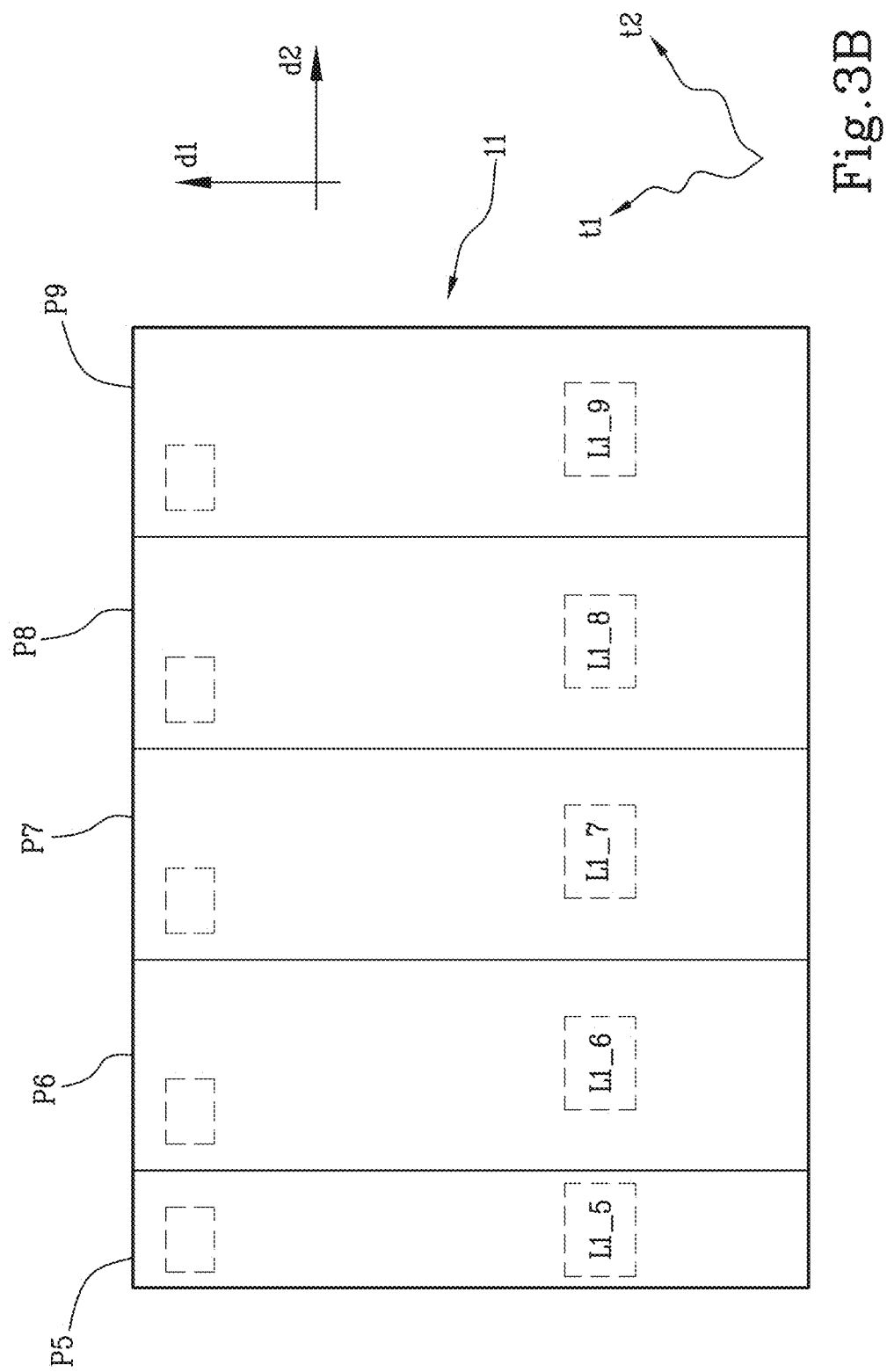
FIG. 3B is a schematic view of FIG. 3A highlighting the specific technical characteristics of FIG. 3A.

The specific technical characteristics of FIG. 3A are shown in FIG. 3B for the purposes of disclosure.

FIG. 3B shows:

the sixth principal module P5 associated with at least a first level L1_5 of the viewable digital contents CD_ij.

In particular, this first level L1_5 comprises the contents related to various utility functions.

a seventh principal module P6, associated with at least a first level L1_6 of the viewable digital contents CD_ij, particularly relating to names of companies connected.

an eighth principal module P7 associated with at least a first level L1_8 of the viewable digital contents Cd_ij, particularly relating to applications activated by the user.

a ninth principal module P8 associated with at least a first level L1_8 of the viewable digital contents CD_ij, particularly relating to names of companies of purchased or preferred products.

a tenth principal module P9 associated with at least a first level L1_9 of the viewable digital contents CD_ij, particularly relating to names of companies with which the user has relations or support.

The modules described are only some examples of groups of information that can be managed at a number of levels with the system/method of the present disclosure. It is understood that the quantity and the information supplied may vary without this limiting the scope of protection of the present disclosure.

The method of the present disclosure, according to that which is shown in the figures described, comprises translating at least one of the principal digital modules Pi, particularly the first principal module P0, along a first path t1, in a second direction d2, so as to create at least partial overlapping of these principal modules.

This determines accessibility to at least part of the viewable digital contents CD_ij of the levels L1_$i$, as a function of the overlapping created.

Preferably, the second direction d2 is a horizontal direction.

In particular, the more some modules overlap, the more the digital contents are revealed of other modules that do not have a number of modules on top of them.

The principal digital modules (Pi, where i=0 . . . n) are independent of each other and/or said derived digital modules (Dij) are independent of each other.

In other words, the content of the modules is interchangeable.

The technical effect achieved is that for the user, the columns appear to be interchangeable.

In one embodiment of the present disclosure, at least some of the principal digital modules Pi are concatenated.

In a preferred embodiment of the present disclosure, all of the principal digital modules Pi are concatenated.

In other words, translation of a principal module Pi in a direction brings about a resulting dragging of at least one of the other principal modules in the same direction.

With reference to FIGS. 1A and 1B, for example, the modules P2, P3, and P4 are "collapsed". With reference to FIGS. 2A and 2B, given that the principal digital modules Pi are concatenated, translation of the module P2 leftward determines the collapse of the module P1 leftward and expansion of the modules P3, P4, and P5 leftward so that they are displayed simultaneously; an operation such as this is also defined as a "scrolling" procedure.

The step of translating the modules is realized by means of an operation for scrolling the concatenated modules Pi and Dij, in which the scrolling procedure varies accessibility to the digital contents CD_ij as a function of at least partial overlapping of the concatenated modules.

The technical effect achieved consists in a dynamic and balanced distribution of the modules and contents thereof on the modular graphic interface 11, ensuring visibility of the maximum possible number of contents compatibly with the interface utilized. In other words, all the viewable parts of the modular interface 11 are occupied by contents.

The derived digital modules Dij are configured to be associated with at least a first level L1_$i$ (where i=0 . . . n) and with at least a second level L2$ij$ of the viewable digital contents CD_ij.

As stated previously, the index "i" in the derived module refers to the principal module from which it is derived, whereas the index "j" represents the progressive number of a derived module of the same principal module; it is understood that an arbitrary number of derived modules of the same principal module can be present.

The derived digital modules (Dij, where i=0 . . . n and j=1 . . . n) can be expanded along a fourth path t4, particularly a fifth direction d5, so as to display a hierarchy Gi representing viewable digital contents of an additional level (L3_$ijk$, where i=1 . . . n, j=i.e. and k=1 . . . n), for which viewing is requested in the derived digital modules Dij and select a viewable digital content (CD_ij) from the hierarchy Gi representing viewable digital contents of said additional level L3_$ijk$ for which viewing is requested in the derived digital modules Dij.

Preferably, the fifth direction d5 coincides with the second direction d2.

Access to a level subsequent to the first level of the viewable digital contents CD_ij is possible only after having accessed the upper levels in the tree hierarchy of the viewable digital contents CD_ij.

With particular reference to FIGS. 4A3, 4B3 and 6, these figures show this tree hierarchy of the digital contents comprised in the database 30 and organized on multiple levels in a dynamically expandable number, as a function of the dimensions/characteristics of the digital contents to be managed.

In one embodiment of the present disclosure, at least some of the derived digital modules Dij are concatenated, bringing about the same technical effect as the concatenated principal modules.

In a preferred embodiment of the present disclosure, all of the derived digital modules Dij are concatenated.

In other words, translation of a derived module Pi in a direction brings about a resulting dragging of at least one of the other derived modules in the same direction.

Alternatively or additionally, the derived digital modules Dij are linked to the respective principal digital modules Pi.

In other words, translation of a principal module Pi in a direction brings about a resulting dragging of the other principal modules in the same direction and of the respective derived modules Dij in the same direction, ensuring the additional technical effect of optimized distribution of all the available information on the modular interface 11.

Modules (principal or derived modules) that have remained open are brought side by side (compressed) until the last module to have been opened and that determined the compression of the other modules closes; when the last module is closed, the other modules return to the position they occupied before that module was opened.

The modules (principal or derived modules) are compressed or expanded and they never close, but they do move to leave room for more recent contents. There is always a reference to the expansion/compression starting point so as to enable a simple and rapid return to the initial data display state on the modular interface.

In a preferred embodiment of the present disclosure, all of the modules are completely overlappable leftward on the interface; in other words, all the principal and derived modules can collapse in the first principal module (or primary module) P0 towards the left end of the interface.

In a preferred embodiment of the present disclosure, only part of the modules are overlappable rightward on the interface; in other words, only a predefined number of modules (e.g. four modules) remain visible on the interface, while the remaining modules almost completely overlap each other, resulting in a step-like effect, at the right end of the interface.

FIG. 4A1 shows a fourth screenshot of the interface 11, in a preferred embodiment of the present disclosure.

The specific technical characteristics of FIG. 4A are shown in FIG. 4B 1 for the purposes of disclosure.

FIG. 4B shows:

the first principal module P0 associated with at least a first level L1_0.

In particular, this first level L1_0 comprises the contents related to management of possible connections with online users (Connect: Create view and manage your connections in FIG. 1A). Identified in FIG. 4A as People, Groups and Hubs, these contents correspond to digital contents CD_01, CD_02 and CD_03, respectively, in FIG. 4B.

a first derived module D01 associated with a second level L2_01.

In particular, this second level L2_01 comprises the digital contents CDijk of each content CDijk of the first level L1_0.

For example, the digital content CD_01 (People in FIG. 4A) of the first level L1_0 is shown as contained in CD_011 to CD_017, which bear the names of the people present (list of first names, last names).

It is understood that the structure of the derived modules can be iterated up to the necessary level of detail/thoroughness of the information.

a minimal part of the second principal module P1, almost totally hidden by the first derived module D01 owing to expansion of the first principal module P0.

the third principal module P2.

the fourth principal module P3.

a minimal part of the fifth principal module P4.

The method of the present disclosure, according to that which is shown in the described figures, comprises expanding the principal digital modules Pi, particularly the first principal module P0, along a second path t2, particularly in a third direction d3, so as to display a hierarchy Gi (where i=0 . . . n) of the first level L1_$i$ of the viewable digital contents CD_ij.

The index "i" in the hierarchy Gi indicates the number of the principal digital module to which the hierarchy belongs.

The hierarchy Gi creates an overview of the information in the digital contents present in the corresponding level of data, making it possible to access, within a specific module, only information of actual interest.

Preferably, the third direction d3 coincides with the first direction d1.

The method comprises selecting a viewable digital content (CD_ij) from the hierarchy Gi where the specific viewable digital contents CD_01, CD_02, and CD03 represent viewable digital contents of a specific second level L2_01, for which viewing is requested. With reference to FIG. 4B, these contents of the second level, is identified by the references CD_011 to CD_017 derived from the viewable digital content CD_01 of the first level L1_0.

Preferably, the selection step comprises one or more of at least the following: clicking with the mouse, touching via a touchscreen, highlighting using a keyboard or similar selection means.

As shown in FIGS. 4A and 4B, with reference to the viewable digital content CD_01 of the first level L1_0, the method comprises a step of expanding the selected viewable digital content CD_01 along a third path t3, particularly in a fourth direction d4, determining at least a first derived digital module D01 so that the latter at least partially overlaps at least one of the principal digital modules Pi, determining accessibility to the viewable digital contents CD_011 to CD_017 of the second level L2_01, as a function of this overlap.

In particular, in the embodiment shown, the first derived digital module D01 almost totally overlaps the second principal module P1, enabling access to the viewable digital contents CD_011 to CD_017 of the second level L2_01.

The steps of translating at least one of the principal digital modules Pi along a first path t1, particularly in a second direction d2, expanding the principal digital modules Pi in the second path t2, particularly in the third direction d3, and expanding the selected viewable digital content CDij in the third path t3, particularly in the fourth direction d4, determine selective dynamic accessibility to the viewable digital contents CD_ij on the modular interface 11, as a function of the levels L1_$i$ and L2_$ij$ and the overlapping of the principal modules Pi and the derived modules Dij.

A first technical effect of the method described up to this point consists in optimized management of the display space. In other words, the system/method of the present disclosure enables the user U to have the greatest possible amount of information under control, in a single operating environment, without connecting to other environments or having to leave the current environment.

A second technical effect achieved consists in an access to contents that is similar to actual experience, rather than to that of an electronic device, thereby determining a rapidly increasing learning and interaction curve.

A third technical effect achieved consists in an access to contents with a reduced number of steps.

With reference to the figures, in a preferred embodiment of the present disclosure, navigation within the management system by means of the interface 11 takes place from right to left (and vice versa in Asian countries) horizontally and vertically within the columns and sub-columns which vary in a horizontal dimension, displaying or hiding the contents.

Upon passage from one content/menu to another within an application, dynamic sub-columns are generated that are in perspective closer (on the z axis) with respect to the parent column, enabling greater focus on the contents and exhibiting clear and ordered room for action.

The greater the width of the column, the greater the distance in perspective becomes with the preceding columns.

The system comprises dynamic interactive animations based on physics and artificial intelligence in response to user action (it creates an organic effect of movement), to the context (for example the colour of some elements of the interface vary as a function of the time), to the interface (mouse, finger, pen, etc.) and to the device (for example if the device has movement sensors, a gyroscope, etc.).

The method according to the present disclosure further comprises the step of updating the viewable digital contents CDij on the interface 11 with the corresponding contents present in the database 30.

Preferably, the updating step is performed in backend.

In other words, the user can create or manage the contents in the database 30, which represents the user's personal Internet space.

The contents of the database 30 are stored remotely, preferably in a cloud.

With reference to FIG. 8, in one embodiment of the present disclosure, realized with or without concatenated modules, the principal digital modules (Pi, where i=0 . . . n) and/or the derived digital modules Dij comprise n-dimensions DIMi.

In other words, each module has n faces configured to contain n pluralities of data/information.

The technical effect achieved consists in the capacity of the module to contain a multitude of data/information that is accessible by "rotating" the n faces of the module.

In particular, each face can be made to correspond to a characteristic or a specific theme or a function or an analysis, etc. and the faces are not all necessarily visible.

In other words, the modules can have a front face and a rear face, but also many lateral faces in the same manner as a polyhedron that is rotatable about its own axis.

Each dimension DIMi of the principal digital modules (Pi, where i=0 . . . n) and/or the derived digital modules Dij comprises characteristics/data defined as a function of configuration parameters (PCi), particularly as a function of one or more of the following configuration parameters PCi (FIG. 8):

PC1: habits of a user (U) of the method;
PC2: device on which the method is applied;
PC3: operating environment in which the method is operating.

In other words, the faces/dimensions DIMi represent contextual containers/functional spaces.

The modules and the relative faces/dimensions DIMi can exist or have characteristics also only in relation to particular functions necessary for the content of the face itself.

Should an application require particular settings to realize these functions, the faces are configured, for this purpose, to function as control panels.

According to the present disclosure, the step of translating at least one of the principal digital modules Pi along the first path t1, particularly the second direction d2, so that the principal digital modules Pi at least partially overlap, is defined as a function of the configuration parameters PCi.

Advantageously, the translation step is carried out according to one of the following possibilities, as a function of the configuration parameters PCi:

standard translation of a module Pi so that it overlaps the module immediately following it;
logical translation of a module Pi so that it overlaps one or more of the other modules Pi, starting from the one immediately following it, until it reaches a logically connected module, as a function of the configuration parameters PCi.

The interface 11 comprises an application configured to perform functions locally on the interface 11, that is, on the electronic device 10, front-end side.

All contents are remote, preferably in a cloud, in the database 30 and they are synchronized with the application of the local interface 11.

The remote information is modified in real time when the modifications are made by means of the interface 11.

In other words, the data in the system are always updated for the user U, as a function of the characteristics of interest selected by means of the digital modules.

The technical effect achieved consists in direct access to the contents of interest, without having to access links or redirected pages.

An additional technical effect consists in the fact that the system is intrinsically updated.

In a third aspect, the present disclosure describes a method for dynamic management of viewable digital contents that is implemented by means of a computer.

In a fourth aspect, the present disclosure describes a modular graphic interface 11.

The modular graphic interface 11 for dynamic management of viewable digital contents CD_ij implements a modular operating environment.

The interface comprises:

principal digital modules Pi extending prevalently in a first direction d1 and configured to be associated with at least a first level L1_$i$ of the viewable digital contents CD_ij;
derived digital modules Dij configured to overlap at least partially at least one of the principal digital modules Pi, determining accessibility to a second level L2_$ij$ of said viewable digital contents CD_ij, as a function of the overlapping that has taken place.

The principal digital modules Pi are expandable along a second path t2, particularly in a third direction d3, so as to display a hierarchy Gi of the first level L1_$i$ of the viewable digital contents CD_ij.

The derived digital modules D2$ij$ and D2$ijk$ are expandable along a fourth path t4, particularly in a fifth direction d5, so as to display a hierarchy Gi of the viewable digital contents CD_ij.

The principal digital modules Pi and/or said derived digital modules Dij are concatenated.

The technical effect achieved by the concatenated modular structure of the interface consists in a dynamic and balanced distribution of the modules and the contents thereof on the interface, ensuring that the modules and the contents occupy the largest possible part of the interface.

The present disclosure offers multiple technical effects and resulting advantages; principally The present disclosure presents a new way of organizing space, the contents and the interactive experience, while preserving elements that are recognizable and familiar to the users of all existing platforms.
The interface is modular and even within limited space, it enables the display of multiple organized contents, which can be reached in a limited number of steps compared to standard interfaces.

Figure 5A:
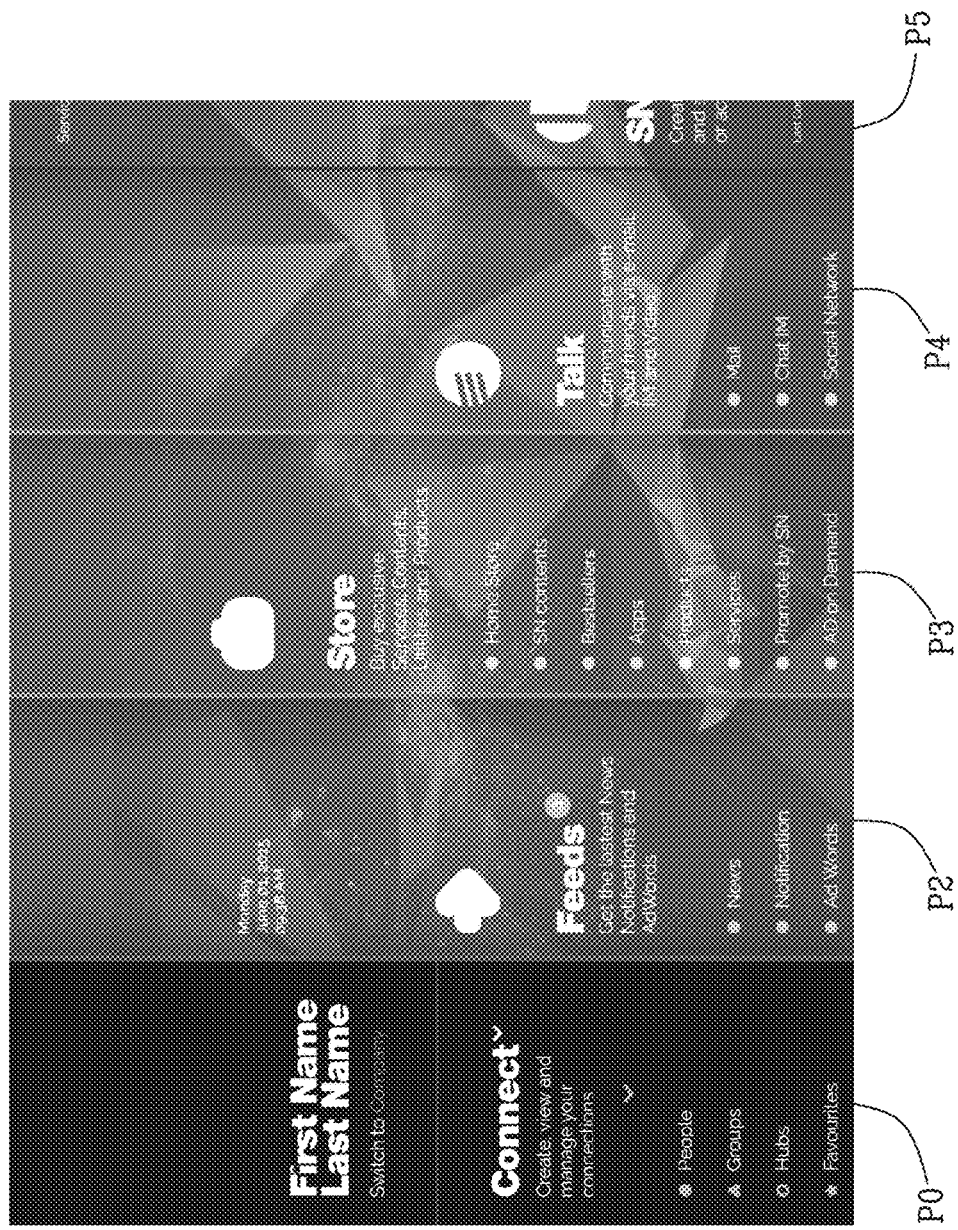
FIG. 5A is a seventh screenshot of the interface as obtained with the system and/or method for dynamic management of digital contents according to the present disclosure, in a preferred embodiment of the present disclosure in a state with a number of expanded principal modules.
Figure 5B:
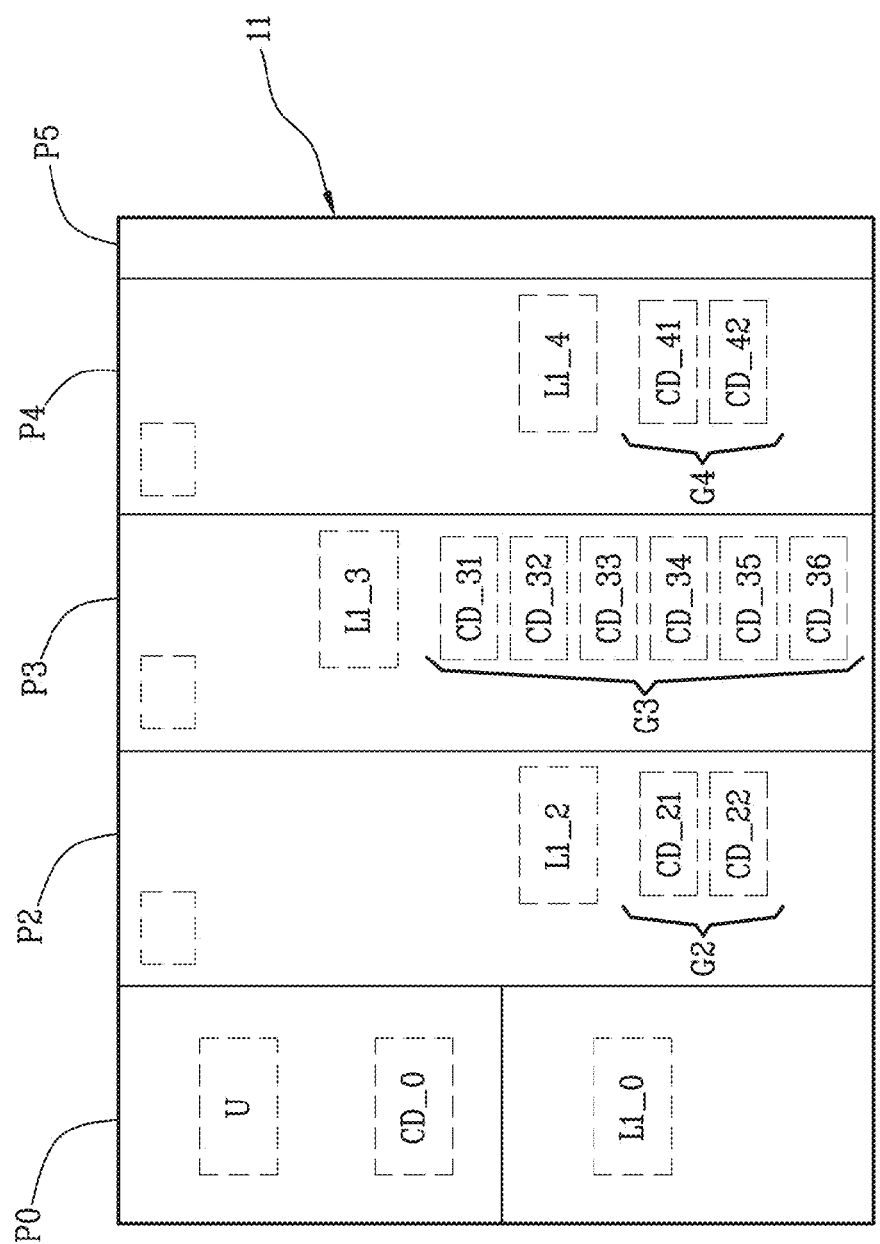
FIG. 5B is a schematic view of FIG. 5A, highlighting the specific technical characteristics of FIG. 5A.
Figure 6:
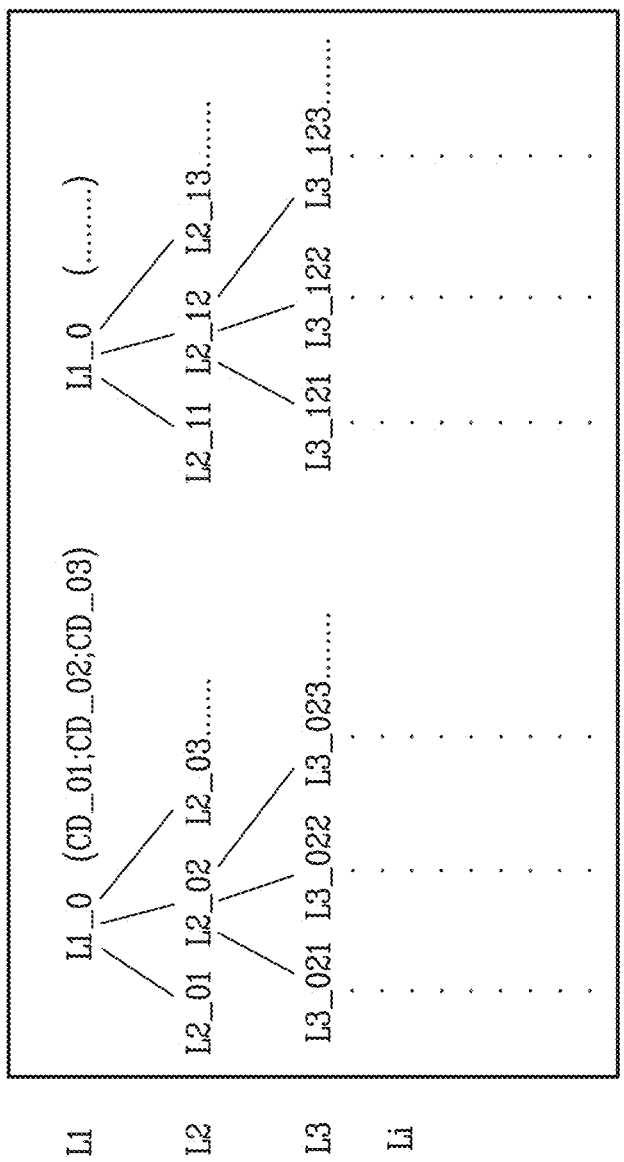
FIG. 6 shows a structure for storing the dynamically managed digital contents, according to the present disclosure.

The following main elements make up the interface of the present disclosure and function preferably as disclosed for the method of the present disclosure and preferably for the disclosed system of the present disclosure:

User environment, that is to say the interface 11, that is, the space that hosts standard elements that can also be customized, in which the user manages his/her contents;
Containers, that is to say the columns identified as principal and derived modules in the description; they are realized as Containers for applications, contents, information, etc.
Dynamic menus, that is, lists of contents, the data of which are extracted from a central database 30, for example "people" in FIG. 4A1 including the items thereof (to which L2_01 in FIG. 4B1 corresponds, with the contents CD_011 . . . CD_017), "hubs" in FIG. 4A2 including the items thereof (to which L2_03 in FIG. 4B2 corresponds, with the contents CD_031 . . . CD_036), and "store" in FIG. 5A including the items thereof (to which L1_3 in FIG. 5B corresponds, with the contents CD_31 . . . CD_36), etc.

The dynamic menus are characterized by:

Headers, for example "people" in FIG. 4A1 (to which L2_01 in FIG. 4B1 corresponds), which present specific useful contextual information for guiding navigation and activate the functions of editing, filtering and organizing contents.
Subheaders (for example possible male/female classification in the case of contents regarding people): present contextual category information with respect to the position of the user.

Lists, for example the people listed in the "people" menu described above and indicated by the contents CD_011 . . . CD_017 in FIG. 4B1: present links to contents or contents ordered by type (or user preferences).

Slider keys (for example scrolling menus with selectable information) and a switch (ON/OFF): enable activation of specific contextual or global functions.

Graphic contents: cover the interface skeleton and present various contents.

Search fields: enable global or contextual searches to be performed, also with the aid of filters, online and off-line.

Warning messages: signal sensitive information or request confirmation action on the part of the user;

Live Help: signals additional dynamic information useful for navigating or defining contents.

The interface of the present disclosure describes contents in the fastest and most organized manner possible. The contents can be arranged by hierarchies, filters, contents, and user preferences.

The interface and related contents can be entirely customized and each container has a configuration section (settings).

Advantageously, the system has been developed with applications dedicated to the available market areas of use:
WEB. HTML5, CSS3, Javascript.
iOS. xCode/Objective-C.
Android. Android SDK/Java
Windows Mobile. Visual Studio/.NET
Personal computer (WEB).

The invention claimed is:

1. A method for dynamic management of viewable digital contents (CD_ij where i=0 . . . n and j=1 . . . m), comprising the steps of:
arranging a modular interface comprising principal digital modules (Pi, where i=0 . . . n) and derived digital modules ((Dij, where i=0 . . . n and j=1 . . . n)) extending prevalently in a first direction and configured to be associated with at least a first level (L1_$i$, where i=0 . . . n) of said viewable digital contents;
translating at least one of said principal digital modules along a first path so that said principal digital modules overlap at least partially, determining accessibility to at least part of said viewable digital contents of said first level as a function of said overlap;
expanding said principal digital modules along a second path so as to display a hierarchy (Gi where i=0 . . . n) of said first level of said viewable digital contents;
selecting a viewable digital content from said hierarchy representing viewable digital contents of a second level (L2_$ij$, where i=0 . . . n and j=1 . . . n), for which viewing is requested; wherein, the second level (L2_$ij$) indicates a second level of data accessible from a j-th derived module of an i-th principal module, and wherein hierarchy of the first level and the second level is a function of a requested degree of detail of the viewable digital contents and of a specific characteristics thereof; and
expanding said selected viewable digital content along a third path, determining at least a first derived digital module (Dij, where i=0 . . . n and j=1 . . . n) so that said at least a first derived digital module at least partially overlaps at least one of said principal digital modules, determining accessibility to said viewable digital contents of said second level, as a function of said overlap, wherein said principal digital modules and/or said derived digital modules comprise n-dimensions, each dimension of the n-dimensions comprising characteristics or data defined as a function of configuration parameters,
wherein said steps of
translating at least one of said principal digital modules along said first path,
expanding said principal digital modules along said second path, and
expanding said selected viewable digital content along said third path, determine selective dynamic accessibility to the viewable digital contents on said modular interface, as a function of said first level, said second level and said overlapping of said principal modules and said derived modules,
and wherein
said step of translating at least one of said principal digital modules along said first path so that said principal digital modules at least partially overlap, is defined as a function of the configuration parameters selected from one or more of a) habits of a user of the method, b) a device on which the method is applied or c) an environment in which the method is operating.

2. The method according to claim 1, further comprising the step of:
setting said first path as a second direction and/or
setting said second path as a third direction and/or
setting said third path as a fourth direction.

3. The method according to claim 1, wherein said principal digital modules are concatenated and/or said derived digital modules are concatenated.

4. The method according to claim 3, wherein said derived digital modules are concatenated with respective said principal digital modules.

5. The method according to claim 1, wherein said translation step is carried out according to one of the following possibilities, as a function of said configuration parameters:
standard translation of a module so that it overlaps the module immediately following it;
logical translation of a module so that it overlaps one or more of the other modules, starting from the one immediately following it, until it reaches a logically connected module, as a function of said configuration parameters.

6. The method according to claim 1, wherein said step of arranging a modular interface further comprises a step of arranging a plurality of layers of modular interfaces, wherein each layer comprises said principal digital modules and said derived digital modules.

7. The method according to claim 1, further comprising a step of arranging a database comprising said viewable digital contents distributed on at least said first level and said second level.

8. The method according to claim 7, wherein said viewable digital contents are viewable by a user identifiable by means of a digital identifying content.

9. The method according to claim 8, further comprising the step of updating said viewable digital contents on the interface with corresponding contents present in said database.

10. The method according to claim 9, wherein said updating process is performed in backend.

11. The method according to claim 1, further comprising:
expanding said derived digital modules along a fourth path so as to display a hierarchy representing viewable digital contents of an additional level, for which viewing is requested in said derived digital modules; and selecting a viewable digital content from said hierarchy representing viewable digital contents of an additional level, for which viewing is requested in said derived digital modules.

12. The method according to claim 11, further comprising the step of setting said fourth path as a fifth direction.

13. The method according to claim 1, wherein said step of translating said modules is realized by means of a scrolling procedure of said concatenated modules, said scrolling process varying accessibility to the digital contents, as a function of at least partial overlapping of the concatenated modules.

14. The method according to claim 1, wherein said modular interface is arranged in an electronic device.

15. The method according to claim 14, wherein said electronic device comprises one or more of at least the following: a computer, a tablet PC, a smartphone, a PDA or like devices.

16. A system for dynamic management of viewable digital contents (CD_ij where i=0 . . . n and j=1 . . . m), comprising:
an electronic device provided with a modular interface that implements an operating environment, wherein the modular interface comprises:
principal digital modules (Pi, where i=0 . . . n) extending prevalently in a first direction and configured to be associated with at least a first level (L1_i, where i=0 . . . n) of said viewable digital contents;
derived digital modules (Dij, where i=0 . . . n and j=1 . . . n) configured to overlap at least partially at least one of said principal digital modules, determining accessibility to a second level (L2_ij, where i=0 . . . n and j=1 . . . n) of said viewable digital contents, as a function of said overlap;
a processing unit comprising:
a translation operating module configured to translate said digital modules along a first path so as to create at least partial overlapping of said modules, determining accessibility to at least part of said viewable digital contents of said first level and said second level, as a function of said overlap;
a first expansion operating module configured to expand said principal digital modules along a second path, so as to display a hierarchy (Gi where i=0 . . . n) of said viewable digital contents;
a selection operating module configured to select a viewable digital content from said hierarchy representing viewable digital contents of at least a second level (L2_ij, where i=0 . . . n and j=1 . . . n), for which viewing is requested; wherein the second level (L2ij) indicates a second level of data accessible from a j-th derived module of an i-th principal module (Pi); and wherein hierarchy of the levels is a function of a requested degree of detail of the viewable digital contents (CD_ij) and of specific characteristics thereof;
a second expansion operating module configured to expand said selected viewable digital content along a third path, determining at least a said first derived digital module;
wherein:
said principal digital modules and/or said derived digital modules comprise n-dimensions, wherein each dimension of the n-dimensions comprises characteristics or data defined as a function of the configuration parameters selected from one or more of a) habits of a user of the method, b) a device on which the method is applied or c) an environment in which the method is operating, and
said translation operating module, said first expansion operating module, said selection operating module and said second expansion operating module bring about selective dynamic accessibility to the viewable digital contents on said modular interface, as a function of said first level and said second level and said overlapping of said principal modules and said derived modules; and wherein
said translation operating module is configured to translate at least one of said principal digital modules along a first path so that said principal digital modules at least partially overlap defined as a function of the configuration parameters selected from one or more of a) habits of a user of the method, b) a device on which the method is applied or c) an environment in which the method is operating.

17. The system according to claim 16, wherein:
said first path is a second direction and/or
said second path is a third direction and/or
said third path is a fourth direction.

18. The system according to claim 16, wherein said electronic device comprises one or more of at least the following: a computer, a tablet PC, a smartphone, a PDA or like devices.

19. The system according to claim 16, comprising a database comprising said viewable digital contents distributed on at least said first level and said second level.

* * * * *